US010196560B2

(12) United States Patent
Zhang et al.

(10) Patent No.: US 10,196,560 B2
(45) Date of Patent: Feb. 5, 2019

(54) PROPPANT TREATMENT WITH POLYMERIZABLE NATURAL OILS

(71) Applicant: TRICAN WELL SERVICE LTD., Calgary (CA)

(72) Inventors: Kewei Zhang, Calgary (CA); Chuanzhong Wang, Calgary (CA); Weibing Lu, Calgary (CA); Leo Liu, Calgary (CA)

(73) Assignee: TRICAN WELL SERVICE LTD., Calgary (CA)

( * ) Notice: Subject to any disclaimer, the term of this patent is extended or adjusted under 35 U.S.C. 154(b) by 0 days.

(21) Appl. No.: 15/011,323

(22) Filed: Jan. 29, 2016

(65) Prior Publication Data
US 2016/0222282 A1    Aug. 4, 2016

(30) Foreign Application Priority Data

Jan. 30, 2015 (CA) .................................... 2880646

(51) Int. Cl.
C09K 8/80 (2006.01)
C09K 8/88 (2006.01)
C09K 8/68 (2006.01)

(52) U.S. Cl.
CPC .................................... C09K 8/805 (2013.01)

(58) Field of Classification Search
None
See application file for complete search history.

(56) References Cited

U.S. PATENT DOCUMENTS

| | | |
|---|---|---|
| 2,331,594 A | 10/1943 | Blair, Jr. |
| 2,765,851 A | 10/1956 | Bond |
| 2,885,078 A | 5/1959 | Fenske |
| 2,935,475 A | 5/1960 | Bernard |
| 3,060,210 A | 10/1962 | De Groot |
| 3,179,250 A | 4/1965 | Bunge |
| 3,271,307 A | 9/1966 | Dickson |
| 3,361,213 A | 1/1968 | Savins |
| 3,373,107 A | 3/1968 | Rice et al. |
| 3,505,374 A | 4/1970 | Monroe |
| 3,595,390 A | 7/1971 | Booth |
| 3,654,201 A * | 4/1972 | Mansour et al. ......... C08F 2/08 524/507 |
| 3,696,923 A | 10/1972 | Miller |
| 3,757,864 A | 9/1973 | Crawford et al. |
| 2,419,755 A | 4/1974 | Albaugh |
| 3,857,444 A | 12/1974 | Copeland |
| 3,864,137 A | 2/1975 | Van Bonin et al. |
| 3,868,318 A | 2/1975 | Clark et al. |
| 3,945,435 A | 3/1976 | Barry |
| 3,980,136 A | 9/1976 | Plummer et al. |
| 3,990,978 A | 11/1976 | Hill |
| 4,000,781 A | 1/1977 | Knapp |
| 4,003,393 A | 1/1977 | Jaggard et al. |
| 4,007,128 A | 2/1977 | Poklacki |
| 4,042,031 A | 8/1977 | Knapp |
| 4,046,795 A | 9/1977 | Martin |
| 4,061,580 A | 12/1977 | Jahnke |
| 4,183,814 A | 1/1980 | Ramachadran |
| 4,231,428 A | 11/1980 | Needham et al. |
| 4,301,868 A | 11/1981 | Scherubel et al. |
| 4,316,810 A | 2/1982 | Burnham |
| 4,368,136 A | 1/1983 | Murphey |
| 4,454,056 A | 6/1984 | Kittelmann et al. |
| 4,512,405 A | 4/1985 | Sweatman et al. |
| 4,537,595 A | 8/1985 | Gruning et al. |
| 4,564,456 A | 1/1986 | Homan |
| 4,585,064 A | 4/1986 | Graham et al. |
| 4,654,161 A | 3/1987 | Kollmeier et al. |
| 4,689,085 A | 8/1987 | Plueddemann |
| 4,725,351 A | 2/1988 | Mehrotra |
| 4,780,220 A | 10/1988 | Peterson |
| 4,832,702 A | 5/1989 | Kummer et al. |
| 4,857,221 A | 8/1989 | Brookes |
| 4,891,166 A | 1/1990 | Schaefer et al. |
| 4,898,957 A | 3/1990 | Plueddemann et al. |
| 4,933,327 A | 6/1990 | Plueddemann et al. |
| 4,960,845 A | 10/1990 | O'Lenick, Jr. |
| 4,964,465 A | 10/1990 | Surles |
| 5,098,979 A | 3/1992 | O'Lenick, Jr. |
| 5,110,485 A | 5/1992 | Huddleston |
| 5,149,765 A | 9/1992 | O'Lenick, Jr. |
| 5,166,297 A | 11/1992 | O'Lenick, Jr. |
| 5,209,775 A | 5/1993 | Bank et al. |
| 5,235,082 A | 8/1993 | Hill et al. |
| 5,240,760 A | 8/1993 | George et al. |
| 5,256,805 A | 10/1993 | O'Lenick, Jr. |
| 5,292,908 A | 3/1994 | Onikata et al. |
| 5,296,117 A * | 3/1994 | De Jaeger ............ C09K 11/025 204/486 |

(Continued)

FOREIGN PATENT DOCUMENTS

| | | |
|---|---|---|
| CA | 1071076 | 10/1975 |
| CA | 1104804 | 12/1978 |

(Continued)

OTHER PUBLICATIONS

"Supplementary European Search Report" dated Mar. 8, 2011, EP 08748188.3 European Patent Office, Munich, Germany (PCT/CA2008/000786); Michael Redecker (9 pages).

(Continued)

Primary Examiner — Jeffrey D Washville
(74) Attorney, Agent, or Firm — Parlee McLaws LLP; Susan Rancourt; Sean Goodwin

(57) ABSTRACT

Described is a proppant composition comprising particulates coated with a polymeric coating comprising a polymerizable natural oil, and a method of making this composition. The polymerizable natural oil is a glyceryl ester that comprises greater than about 40% by weight of polyunsaturated fatty acids, or a derivative of this ester. The proppant composition is made by mixing particulates with a polymerizable natural oil and polymerizing the polymerizable natural oil to coat the surface of the particulates with polymer comprising polymerized natural oil. The composition may be used in a slurry that is used for hydraulic fracturing operations to improve proppant transportation and to mitigate proppant flowback.

7 Claims, No Drawings

(56) References Cited

U.S. PATENT DOCUMENTS

| | | | |
|---|---|---|---|
| 5,306,434 | A | 4/1994 | Schueller et al. |
| 5,332,791 | A | 7/1994 | Knoll et al. |
| 5,359,104 | A | 10/1994 | Higgs et al. |
| 5,474,835 | A | 12/1995 | McCarthy et al. |
| 5,616,758 | A | 4/1997 | McCarthy et al. |
| 5,643,672 | A | 7/1997 | Marchi |
| 5,646,215 | A | 7/1997 | Lee |
| 5,653,794 | A | 8/1997 | Weber et al. |
| 5,693,837 | A | 12/1997 | Smith et al. |
| 5,798,144 | A | 8/1998 | Varanasi et al. |
| 5,824,226 | A | 10/1998 | Boyd et al. |
| 5,858,928 | A | 1/1999 | Aubert et al. |
| 6,047,772 | A | 4/2000 | Weaver et al. |
| 6,060,521 | A | 5/2000 | Sekutowski et al. |
| 6,132,638 | A | 10/2000 | Oldenhove |
| 6,187,720 | B1 | 2/2001 | Acker et al. |
| 6,277,361 | B1 | 8/2001 | Murray |
| 6,297,210 | B1 | 10/2001 | Hsu et al. |
| 6,323,268 | B1 | 11/2001 | Fisher et al. |
| 6,403,163 | B1 | 6/2002 | Fisher et al. |
| 6,482,969 | B1 | 11/2002 | Helmrick et al. |
| 6,524,597 | B2 | 2/2003 | Kashimoto |
| 6,586,497 | B2 | 7/2003 | Gay et al. |
| 6,649,571 | B1 | 11/2003 | Morgan |
| 6,696,052 | B2 | 2/2004 | Aeby et al. |
| 6,729,409 | B1 | 5/2004 | Gupta et al. |
| 6,736,891 | B1 | 5/2004 | Bice et al. |
| 6,830,811 | B2 | 12/2004 | Chao |
| 7,066,528 | B1 | 6/2006 | Crean |
| 7,135,231 | B1 | 11/2006 | Sinclair et al. |
| 7,388,033 | B2 | 6/2008 | Nagy et al. |
| 7,581,590 | B2 | 9/2009 | Lesko et al. |
| 7,723,274 | B2 | 5/2010 | Zhang |
| 7,977,285 | B2 | 7/2011 | Zhang et al. |
| 8,105,986 | B2 | 1/2012 | Zhang |
| 8,236,738 | B2 | 8/2012 | Zhang |
| 8,499,835 | B2 | 8/2013 | Zhang et al. |
| 8,800,658 | B2 | 8/2014 | Zhang |
| 2003/0102128 | A1 | 6/2003 | Dawson |
| 2003/0146134 | A1 | 8/2003 | Yoon |
| 2003/0217953 | A1 | 11/2003 | Xu et al. |
| 2004/0023818 | A1 | 2/2004 | Nguyen et al. |
| 2004/0082055 | A1 | 4/2004 | Hince et al. |
| 2005/0092489 | A1 | 5/2005 | Welton et al. |
| 2005/0187112 | A1 | 8/2005 | Goodhue et al. |
| 2005/0194142 | A1 | 9/2005 | Nguyen et al. |
| 2005/0244641 | A1 | 11/2005 | Vincent |
| 2005/0252658 | A1 | 11/2005 | Willingham et al. |
| 2006/0260810 | A1* | 11/2006 | Weaver ............ C09K 8/80 166/278 |
| 2007/0015669 | A1 | 1/2007 | Zhang |
| 2007/0129257 | A1 | 6/2007 | Kippie et al. |
| 2007/0144736 | A1 | 6/2007 | Shinbach |
| 2007/0197402 | A1 | 8/2007 | O'Neil et al. |
| 2008/0173451 | A1 | 7/2008 | Reddy et al. |
| 2010/0029515 | A1 | 2/2010 | O'Neil et al. |
| 2010/0197526 | A1 | 8/2010 | Zhang |
| 2010/0256024 | A1* | 10/2010 | Zhang ............ C09K 8/62 166/280.2 |
| 2010/0267593 | A1 | 10/2010 | Zhang |
| 2011/0011589 | A1 | 1/2011 | Zhang et al. |
| 2012/0245276 | A1 | 1/2012 | Hagedorn et al. |
| 2012/0071371 | A1 | 3/2012 | Zhang |
| 2012/0073171 | A1 | 3/2012 | Zhang |
| 2012/0181019 | A1 | 7/2012 | Saini et al. |
| 2012/0267105 | A1 | 10/2012 | Zhang |
| 2012/0267112 | A1 | 10/2012 | Zhang et al. |
| 2012/0322697 | A1 | 12/2012 | Zhang |
| 2014/0083696 | A1* | 3/2014 | Nguyen ............ C09K 8/805 166/280.2 |
| 2014/0243245 | A1 | 8/2014 | Zhang |
| 2015/0252254 | A1 | 9/2015 | Zhang et al. |
| 2015/0307772 | A1 | 10/2015 | Zhang et al. |
| 2016/0017213 | A1 | 1/2016 | Zhang et al. |
| 2017/0190962 | A1* | 7/2017 | Raysoni ............ C09K 8/805 |

FOREIGN PATENT DOCUMENTS

| | | |
|---|---|---|
| CA | 1250856 | 3/1989 |
| CA | 2009732 | 2/1990 |
| CA | 2408052 | 8/2001 |
| CA | 2329600 | 6/2002 |
| CA | 2423031 | 10/2003 |
| CA | 2213168 | 1/2005 |
| CA | 2509115 | 12/2005 |
| CA | 2545563 | 11/2006 |
| CA | 2531982 | 7/2007 |
| CA | 2683516 | 10/2008 |
| CA | 2684966 | 11/2008 |
| CA | 2848264 | 11/2008 |
| CA | 2693427 | 1/2009 |
| CA | 2708144 | 6/2009 |
| CA | 2547150 | 1/2010 |
| CA | 2643251 | 5/2010 |
| CA | 2690768 | 7/2011 |
| CA | 2787132 | 7/2011 |
| CA | 2735428 | 9/2011 |
| EP | 113310 | 7/1984 |
| EP | 0266043 A2 | 5/1988 |
| GB | 1584831 | 2/1981 |
| GB | 2387191 | 10/2003 |
| JP | 58146434 | 9/1983 |
| SU | 1126590 | 11/1984 |
| WO | 0222759 A1 | 3/2002 |
| WO | 03018508 A1 | 3/2003 |
| WO | 2005100007 | 10/2005 |
| WO | WO2005124099 | 12/2005 |
| WO | 2006116868 | 11/2006 |
| WO | 2007033489 | 5/2007 |
| WO | 2007145734 | 12/2007 |
| WO | 2008124919 | 10/2008 |
| WO | WO2008131540 | 11/2008 |
| WO | WO 2016/010509 A1 * | 1/2016 |

OTHER PUBLICATIONS

Spheriglass Solid Glass Spheres Brochure: available at http://www.pottersbeads.com/egm/NorthAmerica/Products/SolidGlassMicrospheres/SPHERIGLASS/SPHERIGLASSAGlass.aspx, 2016. (4 pages).

International Search Report, PCT/CA2008/000786, dated Aug. 18, 2008 (2 pages).

Written Opinion of the International Searching Authority, PCT/CA2008/000786, dated Aug. 18, 2008 (5 pages).

International Search Report of PCT/CA2008/001293, dated Jan. 22, 2009 (3 pages).

Written Opinion of the International Search Authority, PCT/CA2008/001293, dated Nov. 10, 2008 (7 pages).

International Preliminary Report on Patentability Chapter I, PCT/CA2008/001293, dated Jan. 19, 2010 (7 pages).

International Search Report PCT/CA2006/000705, dated Aug. 25, 2006 (4 pages).

International Search Report, PCT/CA2006/001567, dated Jan. 3, 2007 (6 pages).

"Supplementary European Search Report" European Patent Application No. EP11734286; Thomas Straub, dated May 23, 2013 (7 pages).

International Preliminary Report on Patentability; The International Bureau of WIPO, PCT/CA2011/000065, dated Jul. 24, 2012, Athina Nickitas-Etienne (6 pages).

International Search Report, PCT/CA2011/000065, Scott Curda, dated Apr. 11, 2011 (4 pages).

Written Opinion, PCT/CA2006/000705, dated Jul. 24, 2006 (6 pages).

Written Opinion, PCT/CA2006/001567, dated Dec. 29, 2006 (7 pages).

Written Opinion of the International Searching Authority, PCT/CA2011/000065, Scott Curda, dated Apr. 11, 2011 (5 pages).

* cited by examiner

PROPPANT TREATMENT WITH POLYMERIZABLE NATURAL OILS

CROSS-REFERENCE TO RELATED APPLICATIONS

This application claims the benefit of Canadian Patent Application 2,880,646, filed Jan. 30, 2015, which is incorporated herein by reference.

FIELD

Compositions and methods for hydraulic fracturing operations, more particularly, the use of polymerizable natural oils to treat proppants for making aqueous slurries during or prior to a fracturing operation and slurries created thereby.

BACKGROUND

Hydraulic fracturing is a technology commonly used to enhance oil and gas production from a subterranean formation. During this operation, a fracturing fluid is injected through a wellbore into a subterranean formation at a pressure sufficient to initiate fractures in the formation. Following the fracture initiation, particulates commonly known as proppants are transported into the fractures as a slurry, that is, as a mixture of proppant suspended in fracturing fluid. At the last stage, fracturing fluid is flowed back to the surface leaving proppants in the fractures, forming proppant packs to prevent fractures from closing after pressure is released. The proppant packs provide highly conductive channels for hydrocarbon to effectively flow through.

There are a number of proppants, including sands, ceramic particulates, bauxite particulates, glass spheres, resin coated sands, synthetic particulates and the like. Among them sands are by far the most commonly used proppants. Proppants normally range in size from 10 to 100 U.S. mesh, which is about 150 to 2,000 μm in diameter.

A vast majority of the fracturing fluids currently used are aqueous-based. Since proppants normally have a significantly higher density than water, for example the density of sand is typically about 2.6 g/cm$^3$ while that of water is 1 g/cm$^3$, high viscosity fluid is required to prevent proppants from settling out of the slurry. For this purpose, water-soluble polymers or viscoelastic surfactants are commonly added into the slurry to increase the fluid viscosity. From a scientific point of view, when a water soluble polymer such as guar gum polymer or one of its derivatives is dissolved in an aqueous liquid, the physical entanglement of polymer chains leads to a significant increase in the fluid viscosity. When polymer chains are further chemically linked by certain chemical compounds known as crosslinkers, forming so-called cross-linked gels, the viscosity is further enhanced. Guar gum cross-linked by borates is a well-known example of this technology in the fracturing industry. In comparison with a cross-linked fluid, linear gels, i.e., fluids containing enough polymer to significantly increase fluid viscosity without cross-linking, cause less formation damage and are more cost-effective, but have relatively poor suspension capability.

Water or slick water, i.e., water containing a very small amount of friction reducing agent, ranging roughly from 0.02% to 0.05% of the fluid, is widely used in fracturing shale or tight formations. Different water-soluble polymers, including guar gum and its derivatives, polyethylene oxide (PEO) and polyacrylamide and its derivatives, can be used as friction reducing agents. Polyacrylamide-based friction reducing agents, which includes polyacrylamides and polyacrylamide copolymers (which contain other monomers in addition to acrylamide monomers), are predominantly used in hydraulic fracturing operations.

Because of its low cost and ability to create a complex fracture network leading to better production, water or slick water has recently become the "go-to" fluid for fracturing shale or tight formations. However, it does not have sufficient viscosity to effectively transport proppants. Poor proppant transport is the single largest disadvantage in using slick water, as much more water is required to transport the same amount of proppant as would a more viscous fluid, to effectively prop open the fracture networks. The amount of water needed to perform a slick water fracturing job typically exceeds 15,000 to 30,000 m$^3$.

Water usage and flowback water management in shale fracturing pose serious environmental challenges. To overcome these disadvantages, U.S. Pat. Nos. 7,723,274 and 8,105,986 to Applicant, incorporated by reference herein in their entirety, teach a composition and method for making stable aqueous slurry to efficiently transport proppants. By rendering the proppant surface hydrophobic, micro-bubbles are attracted and attached to the surface, making the proppant float in the slurry, resulting in an exponential increase in the water's ability to transport proppant without changing fluid rheology.

Not only is proppant transport important, but once proppants are transported into fractures it is highly desirable that they remain in the fractures after the fracturing operation. Unfortunately, it is not unusual that significant amount of proppant is dislodged and entrained in the fracturing fluid that flows out of formation. This process, known as "proppant flowback" in the industry, not only causes undue wear on production equipment but also reduces fracture conductivity. One of the most common approaches for reducing proppant flowback is to use resin coated proppants, normally as tail-in, in the last proppant placement stage. Another method, as disclosed in U.S. Pat. No. 6,047,772, is to use tackifying compounds to coat the proppant grains making them tacky so that they stick together, to retard proppant flowback. Both of these approaches are expensive and usually operationally challenging.

There is interest, particularly in the oil and gas industry, for compositions and methods for treating of particulates, such as proppants, that are more efficient and cost effective.

SUMMARY

Embodiments herein are compositions and methods for treating proppants which use polymerizable natural oils, and which can be applied in hydraulic fracturing operations to improve proppant transportation and to mitigate proppant flowback.

According to one aspect, provided are compositions and methods for treating proppants using natural oils, wherein the natural oils are polymerized through any of a number of mechanisms, including: (i) auto-oxidation, (ii) free radical polymerization, and (iii) cationic polymerization.

In one broad aspect described herein is a proppant composition comprising particulates coated with a polymeric coating comprising a polymerizable natural oil.

In one embodiment of the proppant composition, the polymerizable natural oil is a mixed glyceryl ester having a fatty acid composition greater than about 40% by weight of polyunsaturated fatty acids, or a derivative of this mixed glyceryl ester.

In one embodiment of the proppant composition, the polymerizable natural oil is a mixed glyceryl ester having a fatty acid composition greater than about 50% by weight of polyunsaturated fatty acids, or a derivative of this mixed glyceryl ester.

In one embodiment of the proppant composition, the polymerizable natural oil is a mixed glyceryl ester having a fatty acid composition greater than about 70% by weight of polyunsaturated fatty acids, or a derivative of this mixed glyceryl ester.

In one embodiment of the proppant composition, the polymerizable natural oil is a mixed glyceryl ester having a fatty acid composition greater than about 80% by weight of polyunsaturated fatty acids, or a derivative of this mixed glyceryl ester.

In preferred embodiments of the proppant composition the polymerizable natural oil is tung oil, linseed oil, poppyseed oil, perilla oil, walnut oil or oiticica oil. In particularly preferred embodiments of the proppant composition the polymerizable natural oil is tung oil or linseed oil.

In one embodiment the polymeric coating comprises a polyolefin that has unsaturated carbon-carbon bonds. In a preferred embodiment the polyolefin is an amine terminated butadiene homopolymer.

The derivative of the mixed glyceryl ester may be a fatty acid, a fatty acid ester, and epoxidized mixed glyceryl ester or an acrylated epoxidized mixed glyceryl ester.

In one embodiment of the proppant composition, particulates are selected from the group consisting of sand, ceramic, glass bead, and walnut shell.

In one embodiment of the proppant composition the particulates are sand particulates or ceramic particulates.

In another broad aspect, described herein is a slurry composition for hydraulic fracturing comprising the proppant composition and an aqueous liquid suitable for hydraulic fracturing. The slurry may further comprise a hydrocarbon oil such as a mineral oil or a paraffin oil, or a silicone oil.

In another broad aspect, described herein is a method of making the proppant composition comprising:
a) mixing the particulates with a polymerizable natural oil; and
b) polymerizing the polymerizable natural oil to coat the surface of the particulates with polymer comprising polymerized natural oil.

In one embodiment of the method the polymerizable natural oil is a mixed glyceryl ester having a fatty acid composition greater than about 40% by weight of polyunsaturated fatty acids, or a derivative thereof.

In one embodiment of the method the polymerizable natural oil is a mixed glyceryl ester having a fatty acid composition greater than about 50% by weight of polyunsaturated fatty acids, or a derivative thereof.

In one embodiment of the method the polymerizable natural oil is a mixed glyceryl ester having a fatty acid composition greater than about 70% by weight of polyunsaturated fatty acids, or a derivative thereof.

In one embodiment of the method the polymerizable natural oil is a mixed glyceryl ester having a fatty acid composition greater than about 80% by weight of polyunsaturated fatty acids, or a derivative thereof.

In a preferred embodiment of the method the polymerizable natural oil is tung oil, linseed oil, poppyseed oil, perilla oil, walnut oil or oiticica oil. In a particularly preferred embodiment of the method the polymerizable natural oil is tung oil or linseed oil.

In one embodiment of the method, the polymerizing is by auto-oxidation polymerization, by free radical polymerization or by cationic polymerization.

In one embodiment the polymerizing is by free radical polymerization, and an organic peroxide, an azobisalkylnitrile, a peroxycarbonate or a persulfate salt is used as a free radical initiator. In a preferred embodiment an organic peroxide is used as the free radical initiator.

In one embodiment the polymerizing is by cationic polymerization and a metal halide or a strong protonic acid is used as a cationic polymerization initiator.

In one embodiment the method further comprises after step b), the step of mixing the particulate with an aqueous liquid suitable for hydraulic fracturing.

In one embodiment the method further comprises the step of adding a polyolefin that has unsaturated carbon-carbon bonds to the mixture at step a) above, and then polymerizing the polymerizable natural oil and the polyolefin, to coat the surface of the particulates with polymer comprising polymerized natural oil and the polyolefin. In a preferred embodiment the polyolefin is an amine terminated butadiene homopolymer.

DETAILED DESCRIPTION

For purposes of the understanding specification and the claims appended thereto, a few terms are defined. "Oil" as used herein refers to a neutral, nonpolar chemical substance that is hydrophobic (immiscible with water) and lipophilic (miscible with other oils).

"Natural oil", as used herein, refers to an oil that is extracted from a plant source, as compared to a petrochemical oil, or an oil that is derived from petrochemicals, such as mineral oil. The oil may be derivatized after it is extracted from a plant, before it is used in the compositions and methods described herein.

"Polymerizable oil" as used herein refers to oil that comprises unsaturated carbon-carbon double bonds, and which can be polymerized under certain conditions including in the presence of oxygen, a catalyst, light, an initiator or combinations thereof. Unsaturated carbon-carbon bonds in the hydrocarbon chain enable the polymerization of the oils when they are exposed to heat, light, oxygen, free radicals or an ionic polymerization initiator. Generally, the greater the number of unsaturated bonds, the more easily the oil is polymerized.

Polymerizable natural oils may be mixed glyceryl esters of oleic, linoleic, linolenic, eleostearic, and licanic acids, and related unsaturated fatty acids. Herein unsaturated fatty acids include monounsaturated and polyunsaturated fatty acids. Monounsaturated fatty acids are fatty acids that have one double bond in the hydrocarbon chain with all of the remainder carbon atoms being single-bonded; and polyunsaturated fatty acids have two or more double bonds in the hydrocarbon chain. Generally, the more polyunsaturated bonds, the more likely that polymerization occurs.

In embodiments the polymerizable natural oil is a mixed glyceryl ester in which the fatty acid composition is greater than 40% by weight of polyunsaturated fatty acids (of the total weight of fatty acids). Preferred are mixed glyceryl esters in which the fatty acid composition is greater than about 50%, or greater than about 60% by weight polyunsaturated fatty acids. Particularly preferred are mixed glyceryl esters in which the fatty acid composition is greater than about 70% or about 80% by weight polyunsaturated fatty acids, such as tung oil and linseed oil.

The polymerizable natural oil may be a conjugated or a nonconjugated oil. Nonconjugated oils contain polyunsaturated fatty acids with double bonds that are separated by at least two single bonds. Conjugated oils contain polyunsaturated fatty acids that have one pair of double bonds are separated by only one single bond.

Representative non-limiting examples of polymerizable natural oils include safflower oil, soybean oil, corn oil, sunflower oil, linseed oil, tung oil, walnut oil, poppy oil, perilla oil, oiticica oil, and derivatives of these oils or combinations of these oils, and the like. Preferred for use herein are linseed oil and tung oil. Derivatives of the aforementioned oils used herein include, but are not limited to, fatty acids and fatty acid esters, and the like. Epoxidized and acrylated epoxidized natural oils are also included in the methods and compositions described herein. Drying oils, which are oils that can be polymerized upon exposure to oxygen, fall under the term "polymerizable natural oil". Non-limiting examples of drying oils include tung oil, linseed oil, poppy seed oil, perilla oil, oiticica oil and walnut oil. Particularly preferred for use in the composition and methods described herein are tung oil and linseed oil.

"Initiator", as used herein, refers to a compound that initiates polymerization of the polymerizable natural oils. This term includes but is not limited to, free radical initiators and ionic initiators such as cationic initiators, as are understood in the art.

The initiator may be used in a number of ways. It may be added to the polymerizable natural oil to create a mixture, and the proppant may then be coated with this mixture, allowing the polymerization reaction to proceed for a selected period of time. Alternatively, the oil may be mixed with proppant to coat the proppant with oil, and then the initiator added thereto, after which the polymerization reaction may proceed for a selected period of time. Any of the natural oil, initiator or proppant may be used in an aqueous or nonaqueous liquid medium.

"Free radical initiator", as used herein, refers to a compound that generates free radicals capable of initiating polymerization upon sufficient energy input (e.g. energy from heat, light, or the like). Compounds that may be used as free radical initiators include organic peroxides, azobisalkylnitriles, peroxycarbonates, persulfate salts, and mixtures thereof. Among these, benzoyl peroxide is preferred. The initiator is normally used by mixing with the polymerizable oil and the sand at the concentration about 0.1 to 10 wt. %, preferably 0.5 to 2 wt. % of the oil.

"Cationic polymerization initiator", as used herein, refers to a Lewis acid, which is a metal halide which is selected from the group consisting of $BF_3$, $BCl_3$, $AlCl_3$, $AlBr_3$, $SnCl_4$, $TiCl_4$, $TiBr_4$, $FeCl_3$, $SbCl_5$ and $ZnCl_2$, or a strong protonic acid, including perchloric, sulfuric, phosphoric, fluoro- and chlorosulfonic, methanesulfonic, and trifluoromethanesulfonic acids. $BF_3$ is a preferred cationic polymerization initiator for use herein. The initiator is normally used by mixing with the polymerizable oil and the sand at the concentration about 0.1-10 wt. %, preferably 0.5-2 wt. % of the oil.

The term "aqueous liquid" as used herein means water, salt solutions or water containing an alcohol or other organic solvents. It should be understood that the if additives are added to the aqueous liquid, as discussed further below, they are used in an amount, or in a manner, that is compatible with the methods or composition described herein. The aqueous liquid, is suitable for use in a hydraulic fracturing operation, that is, for use in a fracturing fluid that is used in a well-stimulation operation that fractures rock by using a pressurized liquid, for example, slick water hydraulic fracturing.

The size of the proppant in the compositions described herein ranges from about 10 to 100 U.S. mesh, which is from about 150 to 2,000 μm in diameter. It should be understood that the size distribution of the proppant can be narrow or wide. Suitable proppants include sands, ceramic proppants, glass beads/spheres, synthetic particulates and any other proppants known in the industry. Of these, sand proppants are particularly preferred.

"Polymerization" as used herein means the process of reacting the polymerizable natural oils in a chemical reaction to form more complex products of a higher molecular weight and/or three-dimensional networks of these compounds. In the process of polymerization, double bonds in the fatty acids (primarily but not exclusively carbon-carbon double bonds) are disrupted and the carbon molecules form bonds with neighbouring fatty acid chains, resulting in a polymer type of network that forms a stable hydrophobic film over the surface of the proppant particles. The polymerization may be direct (i.e., the double bonds in the fatty acid chains react directly with one another), or the double bonds in the fatty acid chains may first be chemically modified by introducing functional groups that are easier to polymerize with other fatty acids. Alternatively, the mixed glyceryl esters may be chemically transformed into monomers of the fatty acids, which may then be polymerized.

The present disclosure describes the use of polymerizable natural oils, such as tung and linseed oils, to not only hydrophobicize the surface of proppant particles to enhance transportation during a fracturing operation, but also to strengthen the proppant agglomeration, thereby mitigating proppant flowback after the treatment. Moreover, these oils are environmentally friendly compounds that are derived from a renewable resource, and thus are advantageous to use for hydrophobicizing proppant surfaces. Because a polymerization reaction between the compounds is used to coat the proppant particulates, the presently described compositions and methods are further advantageous for hydrophobically modifying the proppant surface for the following reasons:

a) the particulate-to-particulate interaction (agglomeration) is stronger than with agents that hydrophobicize by adsorption to the surface of the particulates, as the particulates can polymerize to one another via the polymerizable natural oils;

b) the hydrophobic coating may be harder than a coating formed by agents that hydrophobicize by adsorption to the surface of the particulates; and c) the polymerization reaction is a reaction that can be controlled and manipulated, for example, by adjusting temperature, time or the amount of initiator used, to thereby fine-tune the hydrophobicization process.

The methods used to polymerize the polymerizable natural oils on the proppant surface vary, depending on the method of polymerization used, namely auto-oxidation polymerization, free radical polymerization or cationic polymerization.

Ultraviolet irradiation may be used to enhance polymerization. For example, a typical process of auto-oxidation polymerization comprises the following steps:

(1) mix proppant, such as sand, and a polymerizable natural oil, such as tung or linseed oil thoroughly; and (2) expose the mixture to air and/or a source of oxygen overnight at room temperature, to form an oil film on the proppant surface; and optionally (3) heat the mixture to accelerate the polymerization process.

A typical process for free radical polymerization comprises the following steps:
(1) mix proppant, such as sand, a polymerizable natural oil, such as tung or linseed oil, and an initiator, such as benzoyl peroxide, thoroughly;
(2) heat the mixture to accelerate the polymerization process.

A typical process for cationic polymerization is to mix proppant, such as sand, a polymerizable natural oil such as tung or linseed oil, and cationic polymerization initiator such as $BF_3$ thoroughly.

Without being bound by theory, it is believed that the treatment of the proppant according to the method described herein changes the proppant surface, such as the sand surface, from hydrophilic to hydrophobic, inducing bubble adherence to the surfaces leading to proppant flotation and agglomeration, which in turn greatly enhances proppant transportation in a slurry, and furthermore the polymerization of the oils on the proppant surfaces further enhances proppant agglomeration reducing proppant flowback after a fracturing treatment.

Other methods contemplated herein include first partially polymerizing the natural oil in the absence of proppant under suitable conditions, and then coating the proppant by mixing it with the oil while vigorously stirring or agitating. This can be done either at the well site during a fracturing operation or at a facility prior to a fracturing operation.

Other additives may be used in the composition or method described herein, for example:
a) "frothers", which as used herein means compounds that act to stabilize and disperse bubbles in the aqueous medium to better float proppant particles in the slurry. The most commonly used frothers are aliphatic alcohols, including particularly, methyl isobutyl carbinol (MIBC), 2-ethyl hexanol, n-pentanol, n-butyl, n-hexanol, 2-butanol, n-heptanol, n-octanol, isoamyl alcohol as well as cyclic alcohols including pine oil, terpineol, fenchyl alcohol, alkoxy paraffins such as 1, 1, 3,-triethoxybutane (TEB) and polypropyl glycol ethers such as commercial products Dowfroths™ by Dow Chemicals Company. Mixtures of the frothers such as mixtures of the alcohols may be used. A frother can be included in the slurry compositions described herein, by either mixing it with the polymerizable natural oil, the initiator, water and proppant, or it can be added to the slurry composition after proppant has been already treated by the polymerizable natural oil as described herein. Mixtures of the frothers, or frother and an oil such as mineral oil or silicone oil, can be used as well;
b) oils, including hydrocarbon oils, such as mineral oils and paraffin oils, and silicone oils can be used alone or in combination with a frother, as a frother to stabilize the bubbles on the proppant surfaces and further enhance proppant agglomeration; and
c) "hydrophobizing agents", which as used herein means chemical agents that can render the surface of proppants hydrophobic, that is, the water contact angle on the substrate can be increased to above about 70°, and most preferably above about 90°. Exemplary hydrophobicizing agents are those marketed by Applicant under SANDSTILL™ and FLOWRIDER® or MVP FRAC™. Embodiments of such exemplary hydrophobicizing agents are taught in Applicant's following US Patents and published applications, all of which are incorporated herein by reference in their entirety: U.S. Pat. No. 8,236,738; US Published Application 2014-0243245; U.S. Pat. No. 7,723,274; US Published Application 2010-0197526; U.S. Pat. No. 8,105,986; US Published Application 2012-0071371; US Published Application 2015-0252254 and Published Application US 2015-0307772.

Different types of hydrophobizing agents include long chain hydrocarbon amines, silanes, siloxanes, modified polysiloxanes including cationic polysiloxanes such as amine modified polysiloxanes, fluoro-silanes, fluoro-siloxanes, fluorocarbon compounds. Hydrophobic polymers and amine functionalized hydrophobic polymers are hydrophobizing agents. Hydrophobic polymer refers to any polymer that is non-wetting to water and typically has a water contact angle approximately equal to or greater than 90°. Examples of hydrophobic polymers include: (a) polyolefins, which is a class of polymers or copolymers synthesized from a simple olefin as a monomer including ethylene, propylene and butene. Polyolefin includes polyethylene, polypropylene, polybutene, polyisobutylene, poly(isoprene), poly(4-methyl-1-pentene), ethylene propylene copolymers, ethylene-propylene-hexadiene copolymers, and ethylene-vinyl acetate copolymers; (b) styrene polymers, including poly(styrene), poly(2-methylstyrene), styrene-acrylonitrile copolymers having less than about 20 mole-percent acrylonitrile; (c) vinyl polymers, such as poly(vinyl butyrate), poly(vinyl decanoate), poly(vinyl dodecanoate), poly(vinyl hexadecanoate), poly(vinyl hexanoate), poly(vinyl propionate), poly(vinyl octanoate), and poly(methacrylonitrile); (d) acrylic polymers, including poly(n-butyl acetate), poly(ethyl acrylate); methacrylic polymers, such as poly(benzyl methacrylate), poly(n-butyl methacrylate), poly(isobutyl methacrylate), poly(t-butyl methacrylate), poly(dodecyl methacrylate), poly(ethyl methacrylate), poly(2-ethylhexyl methacrylate), poly(n-hexyl methacrylate), poly(phenyl methacrylate), poly(n-propyl methacrylate), poly(octadecyl methacrylate); (e) polyesters, such as poly(ethylene terephthalate), poly(butylene terephthalate), and poly(ethylene terenaphthalate). Normally hydrophobic polymers of low or moderate molecular weight are preferred. Furthermore, hydrophobic polymers that are liquid or viscous liquid at moderate conditions are also preferred. Amine functionalized hydrophobic polymers are hydrophobic polymers that are functionalized by attaching one or more organic amine groups or its derivatives to the polymer chain, either at the end or middle or both. Different organic amines or derivatives thereof can be grafted to the hydrophobic polymers including, for example, organic primary, secondary, tertiary or quaternary amine or its derivatives. The presence of the amine group allows the polymers to more effectively adsorb to the surface of the particulate such as sand. Examples of amine functionalized hydrophobic polymers include: (a) amine functionalized polyolefin including polybutyl amine, polyisobutylene amine, polyisobutylene succinimide, amine functionalized polyethylenes and amine functionalized polypropylenes; (b) amine functionalized styrene polymers such as polystyrene amine, copolymers of styrene and dimethylamino propylamine maleimide; (c) amine functionalized vinyl polymers; (d) amine functionalized acrylic polymers including amine functionalized poly(t-butyl methacrylate), poly(t-butylaminoethyl methacrylate); and (e) amine functionalized polyesters. Examples of these polymers have been disclosed in various patents, which are incorporated herein by reference in their entirety, including U.S. Pat. Nos. 4,832,702; 5,332,791; 5,646,215; 7,388,033 and US Publication No. 2012/0245276. Furthermore, in some cases, the amine functionalized hydrophobic polymers contain reactive groups which can be used to crosslink covalently with each other or with other organic molecules in the compositions or with the particulate surfaces.

For example, in a preferred embodiment of the composition and method described herein, tung oil or linseed oil can be used together with a polyolefin that has unsaturated carbon-carbon bonds, such as amine terminated butadiene homopolymer (ATB). The oil and the polymer are cross-linked with each other. In this example, the proppant agglomeration, due to the polymerisation linking the sand grains together, can be significantly enhanced.

The present disclosure also provides a method for preventing proppant flowback after a fracturing operation. Because of the agglomeration induced by the polymerizable natural oils, proppant in the slurry tends to move cohesively, in contrast to conventional slurries under the same conditions, and therefore proppant flowback is reduced. In this application, the polymerizable oils, such as tung oil and linseed oil, after they are polymerized on the proppant surfaces not only provide proppant surfaces with sufficient hydrophobicity enabling them to float in aqueous liquid, but they also enhance proppant agglomeration further reducing proppant flowback.

As described in U.S. Pat. Nos. 8,236,738 and 8,800,658 the addition of oil, including hydrocarbon oils and silicone oils, can significantly strengthen the agglomeration of particulates, making it even more difficult for flowback fluid to carry the proppant out of fractures, reducing proppant flowback. The inventor understands that the contact angle formed between an oil drop and a particulate surface in water as well as on the solid/water interfacial tension play a significant role in determining the strength of particulate agglomeration. The strength of proppant agglomeration also depends, to an extent, on the amount of oil used for the agglomeration. Proppant coated with a polymerizable oil can be mixed with other oils such as mineral oil (e.g., in a SandStill™ application) to strengthen proppant agglomeration.

For hydraulic fracturing operations, the slurry described herein can be prepared on-the-fly by mixing an aqueous liquid, proppant such as sand, a polymerizable natural oil and an initiator, using conventional mixing methods under sufficient shear, while pumping the slurry into the formation. Additionally a frother such as MIBC, or a frother and oil, can be premixed with the polymerizable natural oil or can be added separately in the slurry to enhance the particulate floatation. Furthermore, a gas such as air, nitrogen or carbon dioxide can also be added in the slurry.

Alternatively proppant can be pretreated, that is, proppant is first treated by contacting a liquid medium containing a polymerizable natural oil and an initiator, and is then separated from the medium after polymerization of the natural oil has occurred. The liquid medium can be aqueous or non-aqueous. The pre-treated proppant can later be mixed with an aqueous liquid to make a slurry. Various proppants including sands and ceramic proppants can be treated during the manufacturing process, where the proppants are treated and then transported to the well site for the fracturing operations. A frother, or a frother and oil, can be added in the slurry to enhance the proppant floatation.

Alternatively again, proppant can be pre-treated on-the-fly in a fracturing operation, that is, the proppant is pre-treated with the polymerizable natural oil and optionally an initiator, before it is added to the blender that will mix the proppant with an aqueous liquid to create a slurry that is pumped into a well. There are a several ways of pre-treating on-the-fly, and the applicant hereby incorporates by reference U.S. application Ser. No. 14/993,030, filed on Jan. 11, 2016.

Applicant contemplates several embodiments of the method for coating proppant and preparing a slurry as contemplated herein. In one approach, proppant may first be treated by contacting it (for example by spraying it) with a liquid medium containing a polymerizable natural oil and an initiator and then subsequently mixing this treated proppant with an aqueous liquid containing, for example a frother or a frother and an oil, in a blender. The resultant slurry is then pumped into a well. Normally, a frother such as MIBC or n-hexanol, or oil are added in a small amount, which is less than 2% and preferably less than 1% of the total fluid volume. Alternatively, proppant may be treated by contacting it (for example by spraying it) with a liquid medium containing a polymerizable natural oil, a frother, or a frother and an oil, and then subsequently mixing this treated proppant with the aqueous liquid in a blender, to make the slurry. Thus, proppant may be treated by contacting it with a medium containing a polymerizable natural oil and an initiator prior to it being added into the blender and subsequently mixed with an aqueous liquid while pumping. A frother or frother/oil can be added to the slurry.

Alternatively, proppant can be treated by contacting the proppant (for example by spraying it) with a medium containing a polymerizable natural oil and an initiator, and the pre-treated proppant is subsequently mixed in a blender with an aqueous liquid and a hydrophobic polymer, while pumping. A frother, or a frother and an oil, can be added to the slurry.

Alternatively again, prior to it being added into the blender proppant can be treated by contacting it with a medium containing a natural oil and an initiator, and the pre-treated proppant is subsequently mixed with an aqueous liquid and a hydrophobic polymer while pumping. A frother, or a frother and an oil, can be added to the slurry.

In each case a gas, such as air, nitrogen or carbon dioxide and mixtures thereof, can also be mixed into the slurry under agitation. The slurry can be prepared on surface (above ground) or in a subterranean formation where proppant, an aqueous liquid, a hydrophobizing agent, such as long hydrocarbon amine, are mixed in situ. Using the composition described herein, a high concentration of proppant can easily be pumped into a formation and the proppant is more evenly distributed in the fracture, leading to improved proppant conductivity.

Another benefit of the slurry described herein is that the aqueous liquid can be re-used after it is separated from the proppant after a fracturing operation. This has great significance considering there is limited water supply in the world for hydraulic fracturing operations. In each case, water, especially slick water, where the fluid itself has very limited proppant transportation capability, is particularly preferred as the fracturing fluid. Linear gels of guar gum and its derivatives or polyacrylamide polymer or its copolymers including hydrophobically modified polyacrylamide can be used as well.

Different fracturing fluids including those comprising aqueous or non-aqueous liquids can be used. Aqueous fracturing fluids are preferred. Water or slick water is particularly preferred. As well, a gas including air, nitrogen carbon dioxide gas can be mixed into the slurry. The slurry can be transported into formation under a high pumping rate.

EXAMPLES

Having thus described the composition and method herein, specific embodiments will now be exemplified.

Example 1A (with Polymerization)

0.3 gram of tung oil and 60 grams of 20/40 US mesh fracturing sand were thoroughly mixed in a 200-mL beaker thus covering the surfaces of the sand particulates with tung oil. Then the mixture was heated to 70° C. for 2 hours, and the sand particulates consolidated into single mass. The treated sand mass was then broken apart and added into 200 ml of slick water, which is an aqueous solution of 0.03 weight percent of polyacrylamide and 0.04 weight percent of methyl isobutyl carbinol. The slurry was vigorously stirred at 2,500 rpm for 10 seconds, and then let stand for the sand to settle down. About 30% of sand was observed to float near the top of the solution.

Example 1B (without Polymerization)

0.3 gram of tung oil and 60 grams of 20/40 US mesh fracturing sand were mixed in a 200-mL beaker thus covering the surfaces of the sand particulates with tung oil. Then the mixture was added into 200 ml of slick water, which is an aqueous solution of 0.03 weight percent of polyacrylamide and 0.04 weight percent of methyl isobutyl carbinol. The slurry was vigorously stirred at 2,500 rpm for 10 seconds, and then let stand for the sand to settle down. No sand was observed to float on the top of the solution.

Example 2A (with Polymerization)

0.3 gram of linseed oil and 60 grams of 40/70 US mesh fracturing sand were mixed in a 200-mL beaker thus covering the surfaces of the sand particulates with linseed oil. Then the mixture was heated to 70° C. for 2 hours, and the sand particulates consolidated into single mass. The treated sand mass was then broken apart and added into 200 ml of slick water, which is an aqueous solution of 0.03 weight percent of polyacrylamide and 0.04 weight percent of methyl isobutyl carbinol. The slurry was vigorously stirred at 2,500 rpm for 10 seconds, and then let stand for the sand to settle down. About 20~30% of sand was observed to float near the top of the solution.

Example 2B (without Polymerization)

0.3 gram of linseed oil and 60 grams of 40/70 US mesh fracturing sand were mixed in a 200-mL beaker thus covering the surfaces of the sand particulates with linseed oil. Then the mixture was added into 200 ml of slick water, which is an aqueous solution of 0.03 weight percent of polyacrylamide and 0.04 weight percent of methyl isobutyl carbinol. The slurry was vigorously stirred at 2,500 rpm for 10 seconds, and then let stand for the sand to settle down. Practically no sand was observed to float on the top of the solution.

Example 3

0.3 gram of tung oil, 30 mg benzoyl peroxide and 60 g of 40/70 US mesh sand were mixed in a 200-mL beaker thus covering the surfaces of the sand particulates with tung oil. The mixture was left overnight at room temperature and the sand particulates consolidated into single mass. The treated sand mass was then broken apart and added into 200 mL of slick water, which is an aqueous solution of 0.03 weight percent of polyacrylamide and 0.04 weight percent of methyl isobutyl carbinol. The slurry was vigorously stirred at 2500 rpm for 10 seconds, and then let stand for the sand to settle down. About 80~90% of sand was observed to float near the top of the solution.

Example 4

0.3 gram of tung oil and 60 grams of 20/40 US mesh fracturing sand were mixed in a 200-mL beaker thus covering the surfaces of the sand particulates with tung oil. 0.05 mL of $BF_3.OEt_2$ was sprayed onto the mixture, and the mixture was thoroughly mixed for about one minute. The coated sand was added into 200 ml of slick water, which is an aqueous solution of 0.03 weight percent of polyacrylamide and 0.04 weight percent of methyl isobutyl carbinol. The slurry was vigorously stirred at 2500 rpm for 10 seconds, and then let stand for the sand to settle down. 70~80% of sand was observed to float near the top of the solution.

Example 5

0.3 gram of tung oil and 60 grams of 20/40 US mesh ceramic were mixed in a 200-mL beaker thus covering the surfaces of the ceramic particulates with tung oil. 0.05 mL of $BF_3.OEt_2$ was sprayed, and the mixture was vigorously stirred for about one minute. The coated ceramic was added into 200 ml of slick water, which is an aqueous solution of 0.03 weight percent of polyacrylamide and 0.04 weight percent of methyl isobutyl carbinol. The slurry was vigorously stirred at 2500 rpm for 10 seconds, and then let stand for the ceramic settle down. About 60% of ceramic was observed to float near the top of the solution.

Example 6

0.3 gram of linseed oil and 60 grams of 20/40 US mesh fracturing sand were mixed in a 200-mL beaker. The mixture was thoroughly mixed until the sand particulate surfaces were homogeneously covered with linseed oil. 0.05 mL of $BF_3.OEt_2$ was sprayed onto the mixture, and the mixture was vigorously stirred for around one minute. The coated sand was added into 200 ml of slick water, which is an aqueous solution of 0.03 weight percent of polyacrylamide and 0.04 weight percent of methyl isobutyl carbinol. The slurry was vigorously stirred at 2500 rpm for 10 seconds, and then left to stand for the sand to settle down. Around 50% of sand was observed to float near the top of the solution.

Example 7

0.3 gram of tung oil and 0.015 gram of ATB (amine terminated butadiene homopolymer) from Emerald Performance Materials, LLC were added into a beaker containing 60 grams of 20/40 US mesh fracturing sand. The mixture was vigorously stirred until the sand surface was homogeneously covered with tung oil. Then 0.01 gram of benzoyl peroxide was added and the sand was vigorously stirred for one minute. The coated sand was then added into 200 ml of slick water, which is an aqueous solution of 0.03 weight percent of polyacrylamide and 0.04 weight percent of methyl isobutyl carbinol. The slurry was vigorously stirred at 2,500 rpm for 10 seconds, and then left to stand for the sand settle down. About 60-70% of sand was observed to float near the top of the solution. Furthermore, it was observed the floating sands were strongly agglomerated together forming sand chunk.

Example 8

0.3 gram of tung oil and 0.015 gram of Genamin® TAP 100 from Clariant International Ltd. were added into a beaker containing 60 grams of 20/40 US mesh fracturing sand. The mixture was vigorously stirred until the sand surface was homogeneously covered with liquid. Then 0.01 gram of benzoyl peroxide was added and the sand was vigorously stirred for one minute. The coated sand was then added into 200 ml of slick water, which is an aqueous solution of 0.03 weight percent of polyacrylamide and methyl 0.04 weight percent of isobutyl carbinol. The slurry was vigorously stirred at 2500 rpm for 10 seconds, and then let stand for the sand to settle down. About 70% of sand was observed to float near the top of the solution.

Example 9

0.3 gram of tung oil, 0.09 gram of styrene and 0.045 gram of divinylbenzene were added into a beaker containing 60 grams of 20/40 US mesh fracturing sand. The mixture was vigorously stirred until the sand surface was homogeneously covered with liquid. Then 0.01 ml of $BF_3.OEt_2$ was added, and the sand was vigorously stirred. The coated sand was added into 200 ml of slick water, which is an aqueous solution of 0.03 weight percent of polyacrylamide and 0.04 weight percent of methyl isobutyl carbinol. The slurry was vigorously stirred at 2500 rpm for 10 seconds, and then left for the sand settle down. 90% of sand was observed to float near the top of the solution. This example uses two different polymers, a polymerizable natural oil (tung oil) and divinyl benzene, which will polymerize to form a copolymer.

While the subject matter has been described in conjunction with the disclosed embodiments and examples which are set forth in detail, it should be understood that this is by illustration only. The scope of the claims should not be limited to the preferred embodiments but should be given the broadest interpretation consistent with the description as a whole.

The invention claimed is:

1. A method of making an aqueous proppant slurry composition comprising the step of mixing coated sand proppant with an aqueous fracturing fluid, wherein the coated sand proppant is prepared by:
    a) providing sand proppant that ranges in size from about 10 to about 100 US mesh;
    b) coating the sand proppant surface with a liquid medium comprising tung oil; and
    c) exposing the coated sand proppant to air and polymerizing the tung oil on the surface of the sand proppant, such that the tung oil is directly in contact with the surface.

2. The method of claim 1 further comprising the step of mixing a gas into the slurry under agitation.

3. The method of claim 2 wherein the gas is selected from a group consisting air, nitrogen and carbon dioxide.

4. The method of claim 2 wherein the gas is nitrogen or carbon dioxide.

5. The method of claim 1 wherein the sand proppant is coated by spraying the liquid medium onto the surface of the sand proppant.

6. The method of claim 1 wherein the aqueous fracturing fluid is a slick water fracturing fluid.

7. The method of claim 6 wherein the aqueous fracturing fluid comprises a polyacrylamide-based friction reducing agent at a concentration of 0.02 wt. % to 0.05 wt. % of the fluid.

* * * * *